INVENTOR
Harry J. White
BY Stowell & Evans
ATTORNEYS

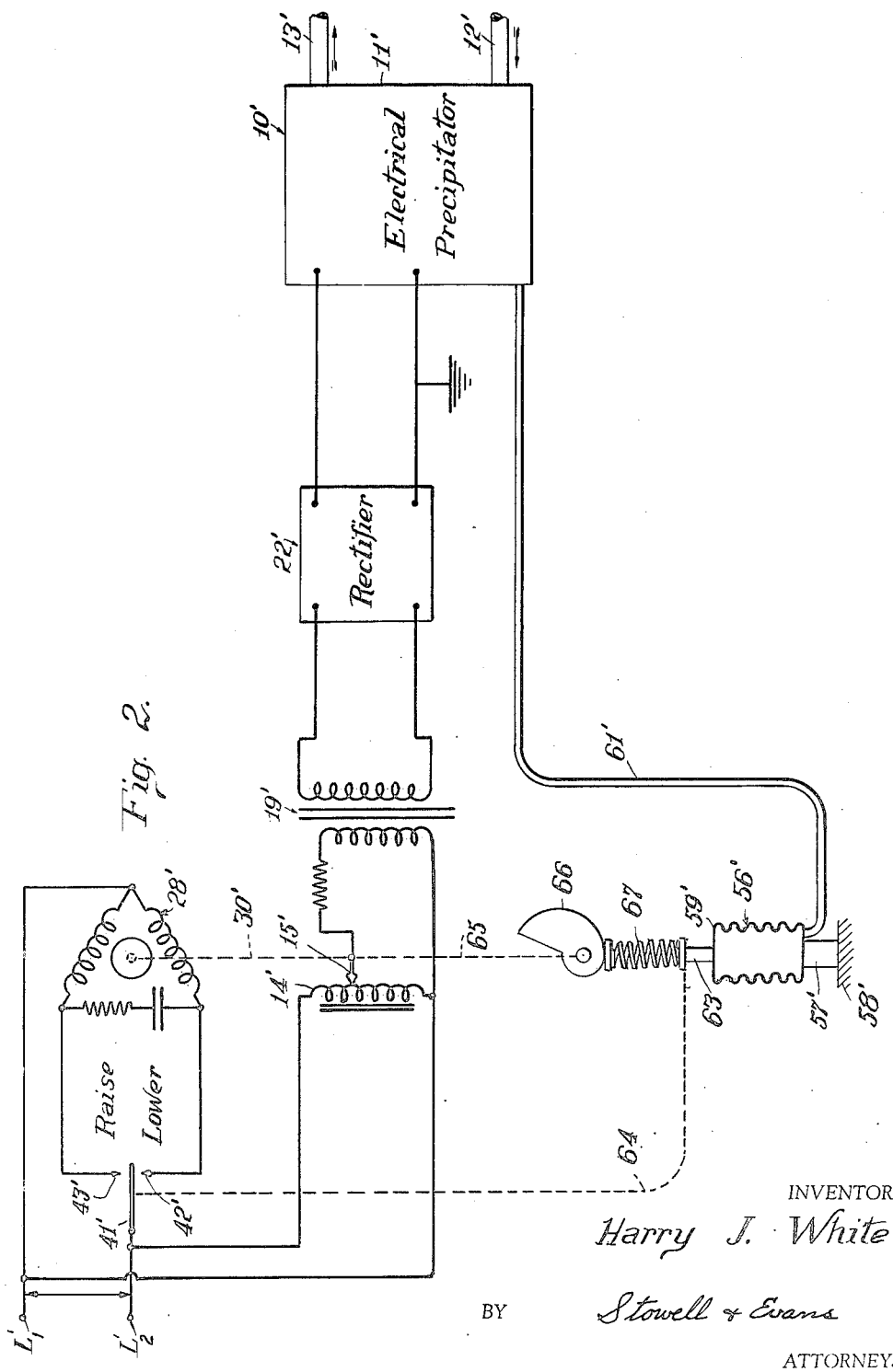

United States Patent Office 2,704,134
Patented Mar. 15, 1955

2,704,134

SYSTEM FOR CONTROLLING THE VOLTAGE APPLIED TO ELECTRICAL PRECIPITATORS IN ACCORDANCE WITH GAS PRESSURE

Harry J. White, Lawrenceville, N. J., assignor to Research Corporation, New York, N. Y., a corporation of New York Application August 30, 1951, Serial No. 244,440

6 Claims. (Cl. 183—7)

This invention relates to an electrical precipitation system and more particularly to a system for controlling the energizing voltage applied to the electrodes of an electrical precipitator in accordance with gas pressure in the precipitator. The invention also relates to a method for controlling the energizing voltage in accordance with variations in gas pressure.

In the operation of electrical precipitators of the Cottrell type at variable gas pressures, the sparkover voltage will vary with gas pressure. Optimum precipitator collection efficiency cannot be obtained for any length of time under these conditions with the customary fixed electrical settings because the voltage must be set near the minimum of the range. Thus, if gas pressure increases significantly, the voltage will be too low. On the other hand, if the voltage is set at a higher value, severe sparking will occur during periods of low gas pressure which will cause unduly low efficiency.

An object of the invention, therefore, is to provide a system and method for automatically setting the precipitator voltage as precipitator gas pressure varies. In this way the inherent disadvantages of variable gas pressure are overcome and continuously high precipitator efficiencies are maintained.

Another object is to provide a system and method for cleaning gases subject to varying pressures such as occur in closed-cycle chemical or combustion processes, or in gas transmission lines where pressures may vary considerably due to variations in gas load.

Another object is to provide a simple and reliable control system of this type that will automatically operate a precipitator at optimum efficiency although gas pressure in the precipitator may vary over a wide range.

In broad principle, the invention utilizes gas pressure within the precipitator as a control parameter, and through a suitable servo-mechanism the precipitator voltage is varied in the desired manner. In many gases, the sparking voltage varies substantially directly with gas pressure over quite wide pressure limits. In other cases, the sparking voltage is a determinable non-linear function of gas pressure and the sparking voltage may increase somewhat less rapidly than gas pressure. In any case, a suitable control mechanism is provided to meet the conditions encountered.

The electrical precipitation system of the invention has an electrical precipitator including a housing, complementary discharge and extended surface electrodes in the housing, and gas inlet and outlet means directing a stream of gas to be cleaned through the housing, means conducting current from the source thereof to the precipitator electrodes, means for varying the potential of the current source or the precipitator energizing current, means responsive to changes in gas pressure in the housing, and control means operatively connecting the gas pressure responsive means to the potential varying means to vary the potential of the current in response to a preselected function of variations in gas pressure.

The system of the invention may advantageously include balancing means operatively connected between the potential varying means and the gas pressure responsive means.

The invention embraces a method for operating an electrical precipitator including continuously sensing gas pressure in a precipitator and continuously varying the voltage of the precipitator energizing current in accordance with a preselected function of variations in the gas pressure.

The invention will be described in greater detail with reference to the drawings in which:

Fig. 2 is a diagrammatic view of another form of system; and

Figure 1:
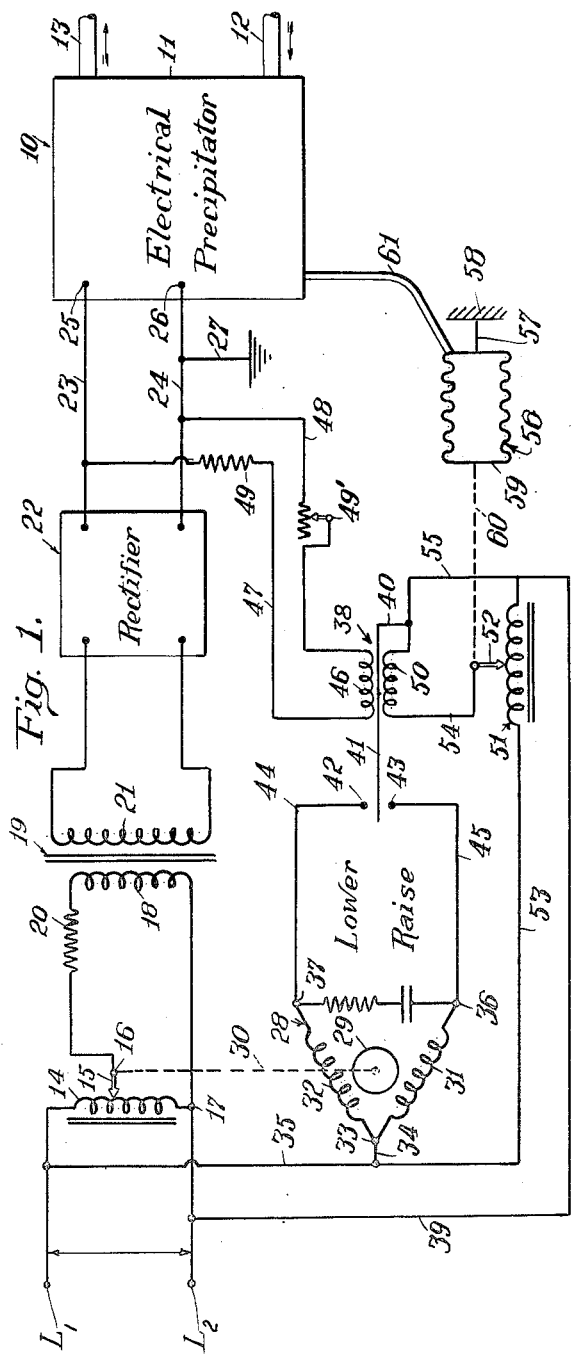
Fig. 1 is a diagrammatic view of one form of electrical precipitation system embodying the invention.

Referring to the drawings, particularly to Fig. 1 thereof, the electrical precipitation system shown has an electrical precipitator 10 of the well known Cottrell type. The precipitator has the usual housing 11, gas inlet conduit 12, through which gas to be cleaned is admitted to the precipitator, and a gas outlet conduit 13, through which cleaned gas issues from the precipitator. As is conventional, the precipitator has within the housing complementary discharge and extended surface electrodes.

The precipitator is energized from a source of current as exemplified by the line $L_1$—$L_2$ supplying alternating current having a typical voltage of 220 volts at 60 cycles. The alternating current is applied to the winding 14 of an autotransformer having a variable tap 15, the position of which on the winding determines the output voltage of the transformer that appears at the terminals 16 and 17.

The output voltage of the autotransformer is applied to the primary winding 18 of a power transformer 19 through a series connected surge controlling resistor 20. The power transformer has a secondary winding 21 providing an output voltage of a high order, say 60,000 volts. The output of the power transformer 19 is rectified in a conventional rectifying device 22, the pulsating unidirectional current output of which is applied through conductors 23 and 24 to the terminals 25 and 26 of the precipitator. Cable 24 may be grounded through the conductor 27 and this side of the high tension line may be connected to the extended surface or collecting electrodes of the precipitator. The other side 23 of the high tension line may be connected to the complementary discharge electrodes through the terminal 25.

Apparatus for controlling the precipitator energizing voltage includes a reversible electric motor 28 the rotor 29 of which is connected through a shaft or linkage 30 to the variable tap 15 of the autotransformer. The motor has a raise voltage winding 31 that, when energized, rotates the rotor in a direction to move the tap 15 to raise the output voltage of the autotransformer; the lower voltage coil 32, when energized, rotates the rotor to effect a reduction in the autotransformer output voltage. The common terminal 33 of the reversible motor is connected through wires 34 and 35 to one side $L_1$ of the A. C. line. The other side $L_2$ of the line is connected selectively to either the raise voltage terminal 36 or the lower voltage terminal 37 of the motor through a differential relay designated by the general reference numeral 38. Current from the side $L_2$ of the line is carried to the motor terminals through wires 39 and 40, relay armature 41 having cooperating contacts 42 and 43, and either of wires 44 or 45.

The differential relay 38 has a coil 46 connected by wires 47 and 48 across the high tension line 23—24 through a voltage dropping resistor 49 and a potentiometer 49'. An opposed coil 50 of the relay is energized from the line $L_1$—$L_2$ through a small adjustable transformer 51 having a variable tap 52. The winding of the transformer is energized through wires 39, 53 and 35 from the line $L_1$—$L_2$, and the output of the transformer is applied to the relay coil 50 through wires 54 and 55.

A Sylphon bellows 56 is mounted adjacent to the variable transformer 51. One end of the bellows is fixed to a rod 57 that is attached to an immobile member 58. The other end 59 of the bellows is free to move towards and away from the member 58 as pressure within the bellows is varied. A linkage mechanism 60 connects the end 59 of the bellows to the movable tap 52 in a manner to impart motion to the tap that corresponds to a function of movement of the bellows. A gas conduit 61 connects the interior of the bellows with the interior of the precipitator housing 11 so that changes in gas pressure in the precipitator are reflected in corresponding pressure changes in the interior of the bellows.

In operation, gas to be cleaned is passed through the precipitator from the duct 12 to the duct 13 and, depending upon the conditions of operation existing at the time, the autotransformer 14, 15 is set at the proper voltage to provide optimum efficiency of precipitator collection. The armature 41 is adjusted to neutral position, if necessary, by adjusting the potentiometer 49'.

If the gas pressure in the precipitator housing increases, thus requiring an increase in electrode energizing voltage for maximum operating efficiency, the bellows 56 expands moving the tap 52 of the adjustable transformer 51 to increase the output voltage of the transformer and hence to increase the current flowing through the coil 50 of the differential relay 38. Thus the relay is unbalanced and the armature 41 swings to close with contact 43 and the reversible motor 28 is energized to move the tap 15 of the autotransformer 14, 15 in a direction to raise the output voltage. This action results in an increase in the voltage applied to the precipitator electrodes. It will be seen that as the voltage applied to the precipitator electrodes increases, the current flowing through the coil 46 of the differential relay also increases and finally reaches a point at which the relay is rebalanced and the armature 41 is returned to neutral. At this point, the precipitator energizing voltage is optimum for the conditions of pressure then existing.

Conversely, if the gas pressure in the precipitator decreases, calling for a lowering of the precipitator energizing voltage, the bellows 56 moves in the opposite direction and the current in coil 50 of the differential relay 38 decreases. Relay balance is upset and the armature 41 moves to close with contact 42. The motor 28 is energized to effect a decrease in the output voltage of the autotransformer 14, 15 and a decrease in the precipitator energizing voltage. Rebalancing of the relay 38 occurs when the precipitator energizing voltage drops to the desired value for the gas pressure existing in the precipitator.

Figure 3:
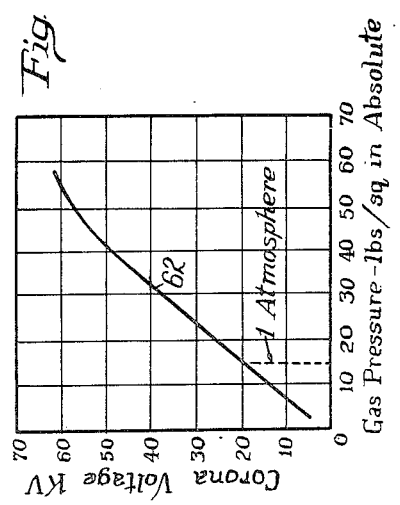
Fig. 3 is a chart showing the relationship between optimum corona voltage and gas pressure for a typical precipitator operating on a typical gas.

Fig. 3 shows in graph form the relationship between gas pressure and optimum corona voltage or precipitator energizing voltage for a typical gas in a typical precipitator. Horizontal distances from the origin represent gas pressures ranging up to 60 pounds per square inch absolute and vertical distances represent corona voltages ranging up to 60,000 volts. The curve 62 is the locus of points correlating corona voltage with gas pressure. The curve is practically a straight line from 2 lbs. gas pressure to 35 lbs. gas pressure. From 35 lbs. to about 60 lbs. gas pressure, the curve falls somewhat from the straight line relationship existing at lower gas pressures. The skilled mechanic will readily perceive that the control system of the invention can be designed, in the light of the present specification, so that the precipitator energizing voltage will follow substantially the voltage-pressure curve for any particular gas in any particular precipitator. For example, the linkage mechanism 60 may be a non-linear or proportional type that introduces the necessary variables required to relate properly the energizing voltage to the gas pressure as sensed by the bellows 56.

In Fig. 2, an alternative form of voltage control system is shown. In this system, the apparatus for energizing the precipitator is the same as that described with reference to Fig. 1. In Fig. 2 parts corresponding to similar parts in Fig. 1 are designated by similar primed reference numerals.

The electrical precipitator 10' is energized from the A. C. line L₁'—L₂' through the variable autotransformer 14', 15', the power transformer 19' and the high voltage rectifier 22', the electrical connections being made as indicated in Fig. 2. The precipitator housing is designated 11' and the gas inlet and outlet ducts are designated 12' and 13'.

The voltage control system includes a bellows 56', the interior of which is in communication with the interior of the precipitator 10' through a gas conduit 61'. The bellows is mounted on a pedestal 57' fixed to a base 58'. On the free end 59' of the bellows is a push rod 63. A mechanical linkage mechanism 64 connects the push rod with the movable switch member 41' that makes contact with either the contact point 43' or the contact point 42' to actuate the reversible motor 28' in a direction to raise or lower the precipitator energizing voltage. Motor 28' is connected to the movable tap 15' of the variable autotransformer through a shaft or linkage 30' to move the tap and thus to vary the voltage in the desired direction. An extension 65 of the shaft 30' drives a cam 66. A spring 67 is compressed between the cam 66 and the push rod 63 of the bellows.

In operation, changes in gas pressure in the precipitator housing 11' are reflected in corresponding movements of the bellows 56' and push rod 63. An increase in gas pressure expands the bellows against the force of spring 67 and closes the switch contacts 41', 43' to raise the precipitator energizing voltage. The action of motor 28' in raising the voltage also turns the cam 66 in a clockwise direction to apply a downward force on the spring 67 which force, as transmitted through the spring, returns the bellows 56' and push rod 63 to a position effecting opening of the switch contacts 41', 43' and discontinuance of the voltage raising action. The cam is so cut that the precipitator energizing voltage is raised only to the optimum value as dictated by the pressure of the gas in the precipitator housing.

Reverse action occurs upon a decline in gas pressure. The push rod 63 moves downwardly to close the switch contacts 41', 42' to actuate the reversible motor 28' in a direction to lower the precipitator energizing voltage. Cam 66 is simultaneously turned in a counterclockwise direction to relieve the downward force on the bellows and to allow the bellows to return to a neutral position opening the switch contacts 41', 42' when the voltage has been lowered to the required value.

From the foregoing description it will be seen that the present invention provides an electrical precipitation system and control device therefor, together with a method of controlling precipitator energizing voltage, that automatically and conveniently accomplishes the objects of the invention.

Those skilled in the art will perceive that a variety of non-inventive modifications and changes may be made in the systems disclosed herein. The pressure sensitive unit, specifically disclosed as a Sylphon bellows, may take other forms such as a diaphragm, piston and cylinder device, Bourdon gauge element or the like. The precipitator voltage control device, shown herein as a variable autotransformer, may be replaced by other voltage control devices such as a saturable core reactor with a control winding, electron tube control devices and the like. Also, a wide variety of devices may be employed for balancing and rebalancing the reversible motor switch actuating means.

I claim:

1. An electrical precipitation system comprising an electrical precipitator including a housing, complementary discharge and extended surface electrodes in said housing, and gas inlet and outlet means directing a stream of gas to be cleaned through said housing, means conducting current from said source to said electrodes, means for varying the potential of said current source, means responsive to changes in gas pressure in said housing, control means operatively connecting said gas pressure responsive means to said potential varying means to vary the potential of said current source in response to a preselected function of variations in said gas pressure, and balancing means operatively connected between said potential varying means and said gas pressure responsive means.

2. An electrical precipitation system comprising an electrical precipitator including a housing, complementary discharge and extended surface electrodes in said housing, and gas inlet and outlet means directing a stream of gas to be cleaned through said housing, means conducting current from said source to said electrodes, means including a variable autotransformer and a reversible motor drivingly connected thereto for varying the potential of said current source, a Sylphon bellows, gas conduit means connecting the interior of said bellows with the interior of said precipitator housing, a switch for actuating said reversible motor, and linkage means connecting said bellows to said switch to operate said motor in accordance with changes in gas pressure in said housing.

3. An electrical precipitation system as defined in claim 2 including balancing means operatively connected between said reversible motor and said bellows.

4. An electrical precipitation system comprising an electrical precipitator including a housing, complementary discharge and extended surface electrodes in said housing, and gas inlet and outlet means directing a stream of gas to be cleaned through said housing, means conducting current from said source to said electrodes, means including a variable autotransformer and a reversible motor drivingly connected thereto for varying the potential of said current source, a Sylphon bellows fixedly mounted at one end and free to move at the other end, gas conduit means connecting the interior of said bellows with the interior of said precipitator housing, a switch for actuating said reversible motor, linkage means connecting said bellows to said switch to operate said motor in accordance with changes in gas pressure in said housing, and balancing means including a cam driven by said reversible motor and a spring acting between said cam and the free end of said bellows.

5. A method for operating an electrical precipitator which comprises continuously sensing gas pressure in a precipitator and continuously varying the voltage of the precipitator energizing current in accordance with a preselected function of variations in said gas pressure.

6. A method of operating an electrical precipitator which comprises continuously sensing gas pressure in a precipitator and continuously varying the voltage of the precipitator energizing current in substantially direct proportion to variations in said gas pressure.

References Cited in the file of this patent

UNITED STATES PATENTS

| 2,050,367 | Myhre | Aug. 11, 1936 |

FOREIGN PATENTS

| 371,859 | Great Britain | Apr. 22, 1932 |